US00RE37909E

(19) United States
(12) Reissued Patent
Tatsumi

(10) Patent Number: US RE37,909 E
(45) Date of Reissued Patent: Nov. 26, 2002

(54) ELECTRONIC KEYBOARD MUSICAL INSTRUMENT

(75) Inventor: Keizo Tatsumi, Hamamatsu (JP)

(73) Assignee: Yamaha Corporation (JP)

(21) Appl. No.: 29/132,044

(22) Filed: Aug. 14, 2000

Related U.S. Patent Documents

Reissue of:
(64) Patent No.: Des. 411,564
Issued: Jun. 29, 1999
Appl. No.: 29/091,877
Filed: Aug. 7, 1998

(30) Foreign Application Priority Data

Feb. 13, 1998 (JP) ..... 10-003684

(51) LOC (6) Cl. ..... 17-01
(52) U.S. Cl. ..... D17/1; D17/5
(58) Field of Search ..... D17/1, 2, 5, 6, D17/7, 9; D21/405; 84/174–177, 423, 428, 644, 670, 719, 744, DIG. 7

(56) References Cited

U.S. PATENT DOCUMENTS

D325,214 S * 4/1992 Hoshina ..... D17/1
5,157,213 A * 10/1992 Kashio et al. ..... 84/644
D340,469 S * 10/1993 Nakada ..... D17/1
D389,507 S * 1/1998 Honda ..... D17/1
D401,611 S * 11/1998 Sato ..... D17/1

* cited by examiner

*Primary Examiner*—Adir Aronovich
(74) *Attorney, Agent, or Firm*—Ostrolenk Faber Gerb & Soffen

(57) CLAIM

The ornamental design for an electronic keyboard musical instrument, as shown.

DESCRIPTION

FIG. 1 is a top view of an electronic keyboard musical instrument;
FIG. 2 is a front view thereof;
FIG. 3 is a rear view thereof;
FIG. 4 is a bottom view thereof;
FIG. 5 is a left-side view thereof; and,
FIG. 6 is a right-side view thereof.

1 Claim, 3 Drawing Sheets

Figure 1:
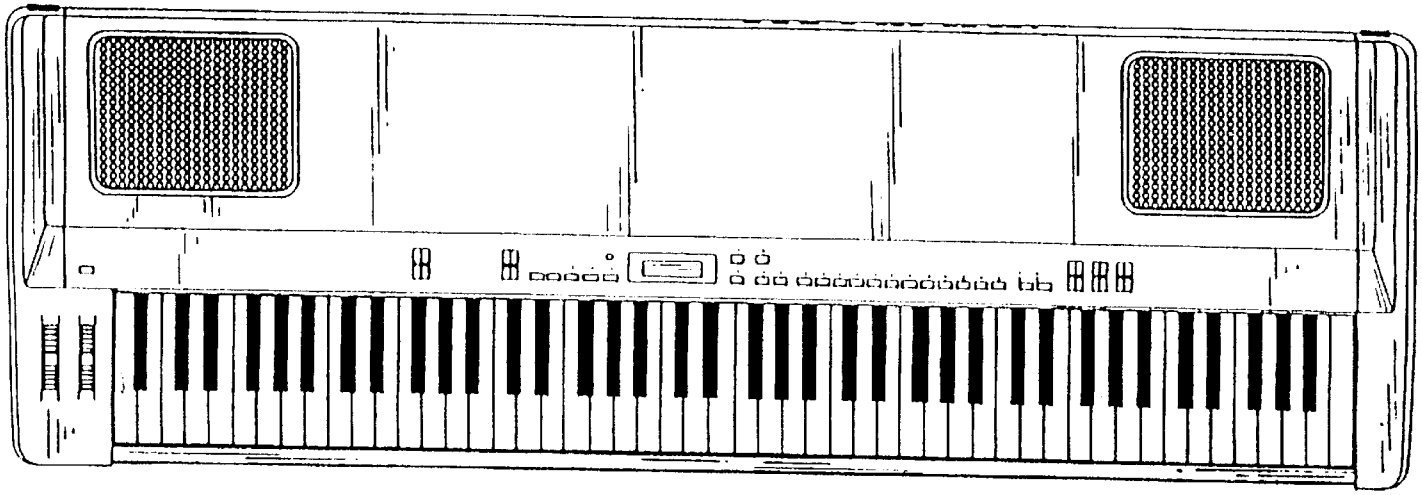
Figure 2:
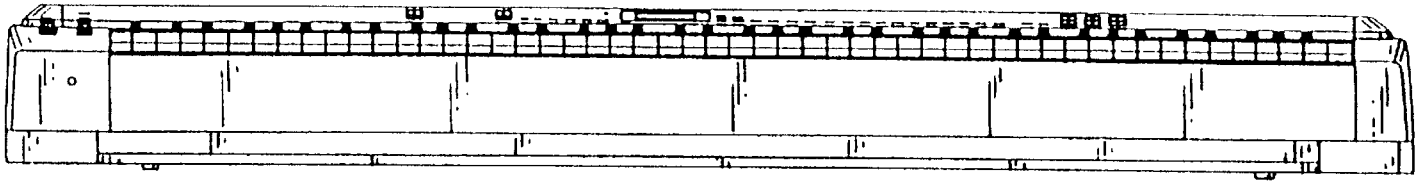
Figure 3:
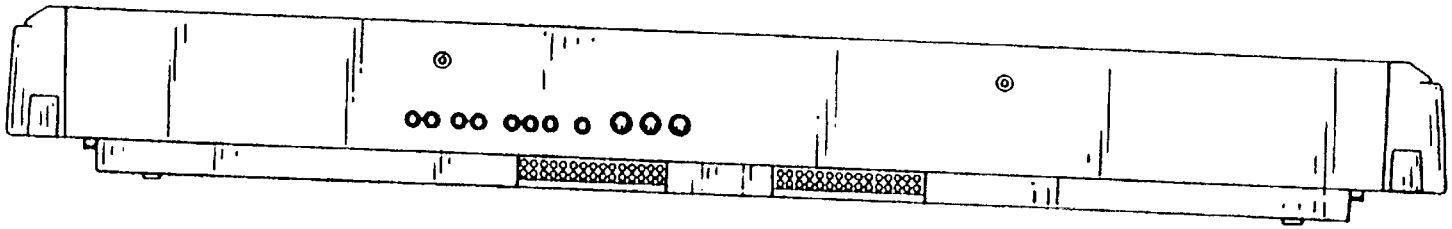
Figure 4:
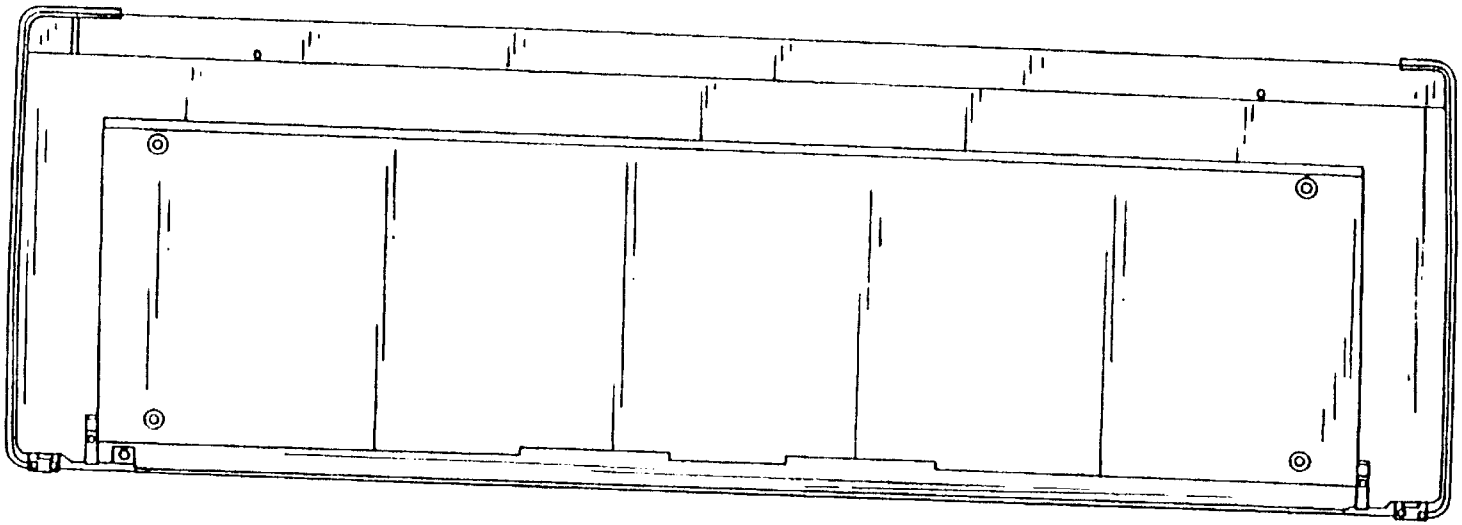
Figure 6:
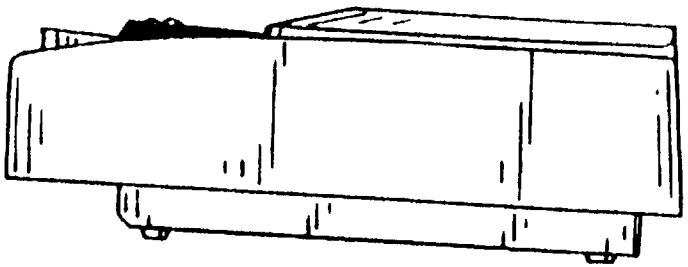
Figure 5:
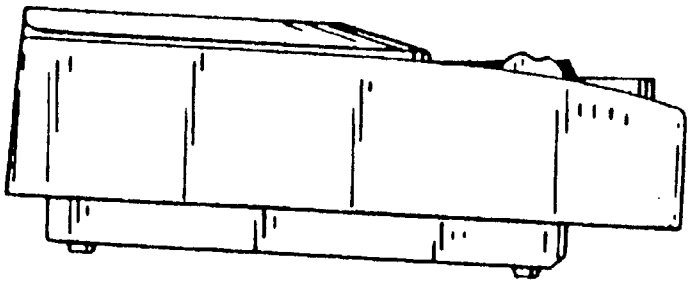

Matter enclosed in heavy brackets [ ] appears in the original patent but forms no part of this reissue specification; matter printed in italics indicates the additions made by reissue.